(12) United States Patent  
Kamikatano et al.

(10) Patent No.: US 8,690,413 B2
(45) Date of Patent: Apr. 8, 2014

(54) LIGHT-EMITTING DEVICE

(71) Applicant: Fujikura Ltd., Tokyo (JP)

(72) Inventors: Mitsura Kamikatano, Sakura (JP); Hideki Sasaki, Sakura (JP); Ren Suzuki, Sakura (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 13/909,501

(22) Filed: Jun. 4, 2013

(65) Prior Publication Data

US 2013/0265802 A1 Oct. 10, 2013

Related U.S. Application Data

(63) Continuation of application No. PCT/JP2012/070481, filed on Aug. 10, 2012.

(30) Foreign Application Priority Data

Aug. 12, 2011 (JP) ................ 2011-176739

(51) Int. Cl.
G02B 5/124 (2006.01)
(52) U.S. Cl.
USPC .......................... 362/615; 362/606
(58) Field of Classification Search
USPC ............... 362/606, 607, 615–629
See application file for complete search history.

(56) References Cited

U.S. PATENT DOCUMENTS

| 5,600,455 A * | 2/1997 | Ishikawa et al. | 349/57 |
| 5,980,054 A * | 11/1999 | Fukui et al. | 362/625 |
| 7,095,942 B2 * | 8/2006 | Lin et al. | 385/146 |
| 7,682,062 B2 * | 3/2010 | Stadtwald-Klenke | 362/612 |
| 2004/0125592 A1 * | 7/2004 | Nagakubo et al. | 362/31 |
| 2005/0122743 A1 * | 6/2005 | Lin | 362/615 |
| 2010/0135043 A1 * | 6/2010 | Wang et al. | 362/628 |
| 2011/0002142 A1 * | 1/2011 | Yuuki et al. | 362/606 |
| 2011/0286238 A1 * | 11/2011 | Kurata et al. | 362/606 |

FOREIGN PATENT DOCUMENTS

| EP | 2 009 615 A1 | 12/2008 |
| JP | 3-503094 A | 7/1991 |
| JP | 2004-319252 A | 11/2004 |
| JP | 2005-3734 A | 1/2005 |
| JP | 2010-508553 A | 3/2010 |
| WO | 90/07766 A1 | 7/1990 |
| WO | 2007/123202 A1 | 11/2007 |
| WO | 2008/053078 A1 | 5/2008 |

OTHER PUBLICATIONS

International Search Report for PCT/JP2012/070481 dated Oct. 2, 2012, English Translation.

* cited by examiner

*Primary Examiner* — Nimeshkumar Patel
*Assistant Examiner* — Christopher Raabe
(74) *Attorney, Agent, or Firm* — Sughrue Mion, PLLC

(57) ABSTRACT

A light-emitting device includes a transparent light guide plate and a light source that irradiates light onto the light guide plate, in which a plurality of dot-shaped light-emitting concave portions having light output surfaces that output incident light derived from the light source from light-emitting surfaces are formed on the light guide plate, and a diffraction grating, which is an assembly of grooves paralleled at a constant pitch, is formed on each of the light output surfaces of the dot-shaped light-emitting concave portions.

14 Claims, 18 Drawing Sheets

LIGHT-EMITTING DEVICE

CROSS REFERENCE TO RELATED APPLICATIONS

This application is a continuation application based on a PCT Patent Application No. PCT/JP2012/070481, filed Aug. 10, 2012, whose priority is claimed on Japanese Patent Application No. 2011-176739 filed Aug. 12, 2011, the entire content of which are hereby incorporated by reference.

BACKGROUND OF THE INVENTION

1. Field of the Invention

The present invention relates to a light-emitting device used for a display and the like, and more particularly to a light-emitting device utilizing a light guide plate.

2. Description of the Related Art

In recent years, in a light guide plate utilized in a light-emitting device such as an advertising light panel and the like, a rear surface of the light guide plate is concavely processed by using a laser processing, mechanical processing or the like to make a particular design, and by forming a dot-shaped reflective portion, incident light from an end surface of the light guide plate is reflection-scattered on the reflective portion to light-emit the design (see for example, PCT International Publication No. WO2007-123202).

The description in Published Japanese Translation No. H3-503094 of the PCT International Publication states that incident light from an end surface is diffracted by a diffraction grating formed on a light guide plate, and an observer visually recognizes the diffracted light.

Incident white light is dispersed on a diffraction grating, and then diffracted to different angles depending on each wavelength, and therefore, when a certain design is composed with diffraction gratings and irradiated with light from the outside, the design shines in an iridescent color, or a color is changed with a change of viewing position. Given such visual effects, diffraction gratings have been widely used for decorating purposes.

However, in the method described in PCT International Publication No. WO2007-123202, a light-emitting color of a design is basically the same as a color of incident light, because the method utilizes reflection scattering of incident light that has entered onto a light guide plate. Therefore, although a color of incident light can be changed depending on positions and times, a light-emitting color within a defined area will basically be the same as a color of incident light.

In a light-emitting device described in Published Japanese Translation No. H3-503094 of the PCT International Publication, the whole design is made as a diffraction grating. In this method, a visual effect relating to a color specific to the diffraction grating can be obtained; however, when newly creating a design containing such a large sized diffraction grating, a large cost and a long time are required because a diffraction grating requires a fine pattern of a submicron level.

The present invention has been completed in light of the above, and an object of the present invention is to simply provide a light-emitting device that can add a visual effect with various colors to a design even if the light-emitting status of a light source is constant on a light guide plate that reflects light from a light source to a reflective surface formed on the light guide plate.

SUMMARY OF THE INVENTION

The problems described above will be solved by the following means of the present invention.

The present invention provides a light-emitting device including a transparent light guide plate and a light source that irradiates light onto the light guide plate, in which a plurality of dot-shaped light-emitting concave portions having light output surfaces that output incident light derived from the light source from light-emitting surfaces are formed on the light guide plate, and a diffraction grating, which is an assembly of grooves paralleled at a constant pitch, is formed on each of the light output surfaces of the dot-shaped light-emitting concave portions.

The light output surface is preferably a reflective surface that reflects light derived from the light source, and outputs the light from the light-emitting surface.

The light output surface is preferably a transmission surface that transmits light derived from the light source, and outputs the light from the light-emitting surface.

The dot-shaped light-emitting concave portions are preferably formed on a rear surface that is opposite the light-emitting surface of the light guide plate.

The light source is preferably provided on an end surface of the light guide plate, and irradiates light from the end surface.

The grooves of the diffraction gratings are preferably formed in the direction of a line on the light output surface, in which the line is orthogonal to an intersection of a surface including the light output surface and the rear surface.

The number of grooves in the diffraction grating is preferably equal to or more than 200 and equal to or less than 2000 per 1 mm.

The plurality of dot-shaped light-emitting concave portions may be arranged to form a particular design as a whole.

An angle of the light output surface to a rear surface that is opposite the light-emitting surface of the light guide plate is preferably equal to or more than 0° and equal to or less than 90°.

An angle θ of the dot-shaped light-emitting concave portions to the light source may be adjusted so that a same color is observed within at least a partial area in the light guide plate when viewed from a certain point.

An angle θ of the dot-shaped light-emitting concave portions to the light source may be adjusted so that a color is randomly distributed within at least a partial area in the light guide plate when viewed from a certain point.

The light source can be a structure in which a plurality of the light-emitting diodes or laser diodes that are aligned in a direction to which the light guide plate extends.

All of the light sources can be a white light source.

According to the present invention, a diffraction grating is formed on a reflective surface that is formed on a light guide plate, and thereby a visual effect with various colors can be added even if the light-emitting status of a light source is constant.

DETAILED DESCRIPTION OF THE PREFERRED EMBODIMENTS

Hereinafter, a light-emitting device of the present invention will be explained with reference to the figures.

Figure 1:
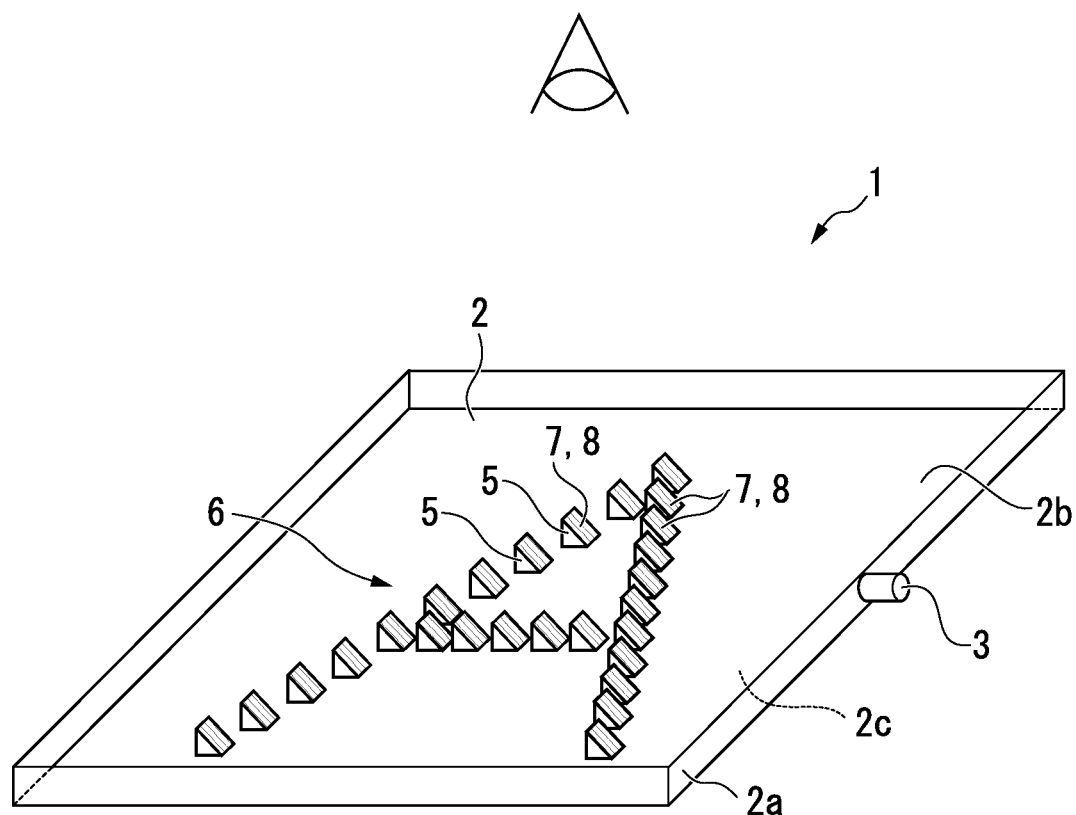
FIG. 1 is a perspective view of a light-emitting device according to an embodiment of the present invention.
Figure 2:
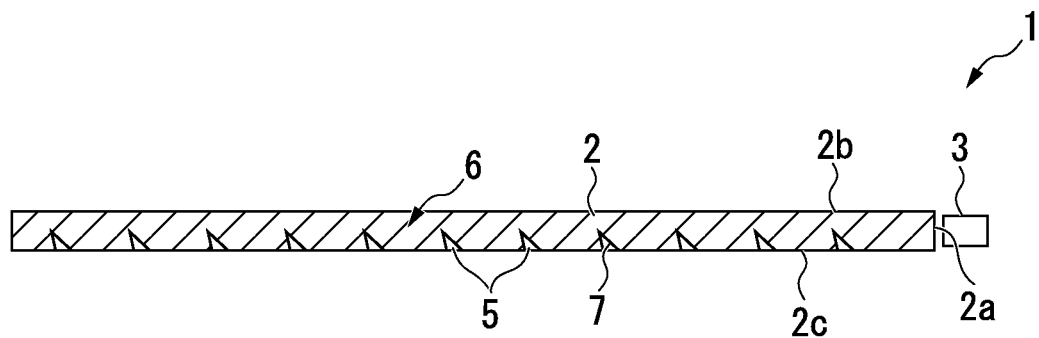
FIG. 2 is a cross-sectional view of a light-emitting device according to an embodiment of the present invention.

As shown in FIGS. 1 and 2, a light-emitting device 1 has a rectangular plate-shaped light guide plate 2 and a light source 3 that is provided on an end surface 2a of the light guide plate 2, and reflects incident light derived from the light source 3, and then outputs the light from a light-emitting surface 2b of the light guide plate 2. Although an observer is located at the upper front side of the light guide plate 2 in FIG. 1, the observer is supposed to be located in a particular direction and a distance from the light guide plate 2.

The light guide plate 2 is made of acrylic resin, and its thickness can be, for example, 0.1 mm-10 mm. The light guide plate 2 preferably has sufficient light transmissiveness, and is not limited to acrylic resin, and a plate made of synthetic resin, such as polycarbonate resin, silicone resin, cyclopolyolefin resin and the like, and a glass plate can also be used. Also, a shape of the light guide plate 2 is not limited to a rectangular plate shape, as long as functional surfaces including the end surface 2a, the light-emitting surface 2b, and a rear surface 2c can be formed on the light guide plate 2. A thickness of the light guide plate 2 is preferably constant.

The light source 3 is a white light-emitting diode unit, and is located on the end surface 2a of the light guide plate 2 so that light enters onto a light guide plate. The light source 3 may be a combination of a blue light-emitting diode and a yellow fluorescent substance, or may be a light-emitting source made with light-emitting diodes of red, green, and blue colors (i.e., RGB), or may be other systems. The light source 3 is not limited to light-emitting diodes, and LD (laser diode) and the like can also be used.

Figure 3:
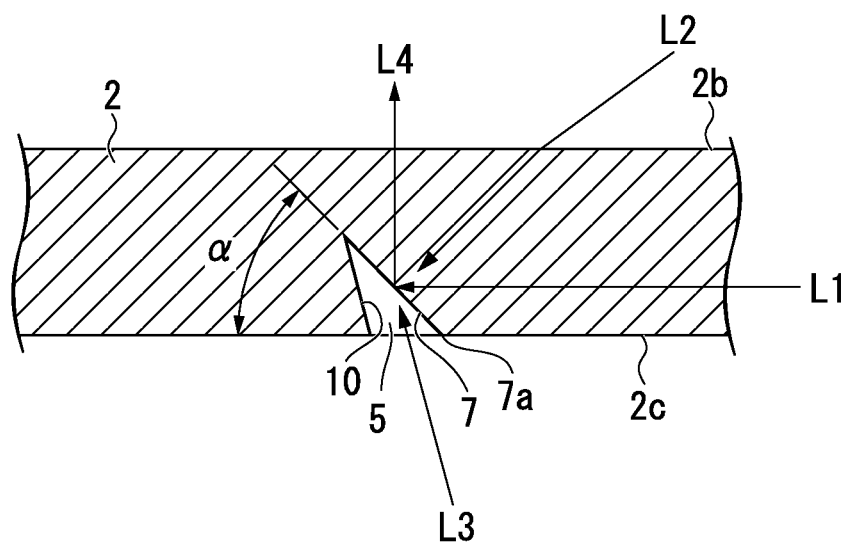
FIG. 3 is an enlarged cross-sectional view of a dot-shaped light-emitting concave portion according to an embodiment of the present invention.

A display portion 6 including a plurality of dot-shaped light-emitting concave portions 5 is formed on the light guide plate 2. As shown in FIG. 3, the dot-shaped light-emitting concave portion 5 is a notch formed on the rear surface 2c that is opposite the light-emitting surface 2b of the light guide plate 2, and the dot-shaped light-emitting concave portion 5 has a reflective surface 7 (light output surface) that reflects light, which is output from the light source 3 and then entered from the end surface 2a, to the side of the light-emitting surface 2b. A shape of the dot-shaped light-emitting concave portion 5 allows the reflective surface 7 to receive light derived from the light source 3. In the example shown in FIG. 3, the reflective surface 7 is a sloping surface that gradually lowers as it approaches the light source 3 (to the right side in FIG. 3).

As shown in FIG. 3, a cross-sectional shape of the dot-shaped light-emitting concave portion 5 along the direction where light derived from the light source 3 enters is a triangle whose oblique side is the reflective surface 7 formed on the side of the end surface 2a. The reflective surface 7 is preferably flat. FIG. 3 shows a cross-section vertical to both the reflective surface 7 and the rear surface 2c.

Figure 4:
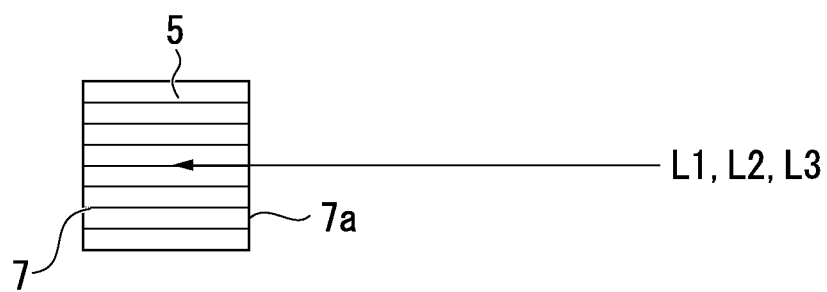
FIG. 4 is a plan view of a dot-shaped light-emitting concave portion according to an embodiment of the present invention.

As shown in FIG. 4, a planar view of the dot-shaped light-emitting concave portion 5 represents a substantial rectangular shape. The marginal portion of the reflective surface 7, which is most close to the light source 3 (in FIG. 4, it is a base 7a that is most close to the light source 3 among four sides of the reflective surface 7) can be vertical to incident light derived from the light source 3 in the planar view. Note that the base 7a is not necessarily vertical to the incident light in the planar view.

Figure 5A:
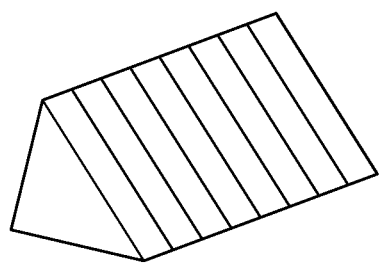
FIGS. 5A-5D are enlarged perspective views of a dot-shaped light-emitting concave portion according to an embodiment of the present invention.
Figure 5B:
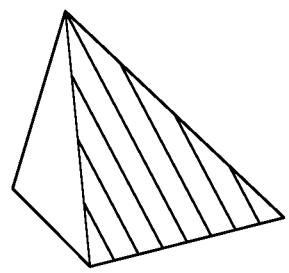
Figure 5C:
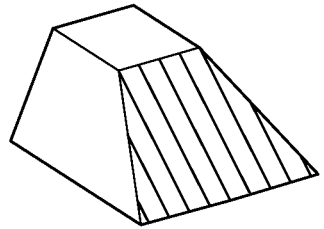
Figure 5D:
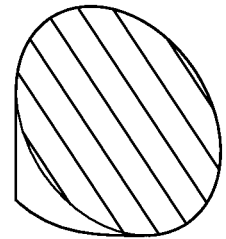

A shape of the dot-shaped light-emitting concave portion 5 shown in the figures is not limited, as long as it is formed in the light guide plate 2, and has the reflective surface 7 that reflects light derived from the light source 3 to the side of the light-emitting surface 2b. For example, it can be a prism shape shown in FIG. 5A, a pyramid, such as triangular pyramid, quadrangular pyramid and the like shown in FIG. 5B, or a trapezoidal pyramid shown in FIG. 5C. In addition, it can be a shape formed by obliquely cutting a cylinder or a cone as shown in FIG. 5D.

In addition, it can be a through-hole formed on the light guide plate 2, or an empty portion formed in the light guide plate 2.

A slope angle of the reflective surface 7 to the rear surface 2c of the light guide plate 2 (the angle α shown in FIG. 3) can be equal to or more than 0° and equal to or less than 90°. The slope angle α can be over 0°, but equal to or less than 90° (0°<α≤90°). In particular, equal to or more than 30° and equal to or less than 60° is preferable.

When the slope angle α is too small, a slope angle of output light will be large, and visual recognition of the dot-shaped light-emitting concave portion 5 when the light-emitting device 1 is viewed from the front side will be decreased. When a slope angle is too large, an incident angle of light exceeds a critical angle, and a rate of light transmitting through the reflective surface 7 is increased, and thereby reflection efficiency of light is decreased. According to this, visual recognition of the dot-shaped light-emitting concave portion 5 when viewed from the front side will also be decreased.

According to the above, a slope angle of the reflective surface 7 is preferably equal to or more than 30° and equal to or less than 60°. When a slope angle is within this range, reflection efficiency of light can be increased, and reflected light can be output with an angle mostly vertical to the light-emitting surface 2b, and thereby visual recognition of the dot-shaped light-emitting concave portion 5 can be increased.

The slope angle α is an angle between the reflective surface 7 and the rear surface 2c. Particularly, it is an angle between the reflective surface 7 and the rear surface 2c with the proviso that the dot-shaped light-emitting concave portion 5 is located between the reflective surface 7 and the rear surface 2c.

Note that because the rear surface 2c and the light-emitting surface 2b are parallel in the examples shown in the figures, the slope angle α is also a slope angle of the reflective surface 7 to the light-emitting surface 2b.

As shown in FIG. 3, among the inner surfaces of the dot-shaped light-emitting concave portion 5, the opposed surface 10 that is opposed to the reflective surface 7 can be a sloping surface that gradually lowers as it approaches the light source 3 (to the right side in FIG. 3), or can be a surface vertical to the rear surface 2c.

In the display portion 6, a plurality of the dot-shaped light-emitting concave portions 5 are aligned to make a particular pattern. In the light-emitting device of the embodiment, although the dot-shaped light-emitting concave portions 5 are aligned to represent the character "A," it is not limited to the alignment, and the dot-shaped light-emitting concave portions 5 can be aligned to make other characters, symbols, graphics, patterns, or combinations of two or more thereof.

Figure 6:
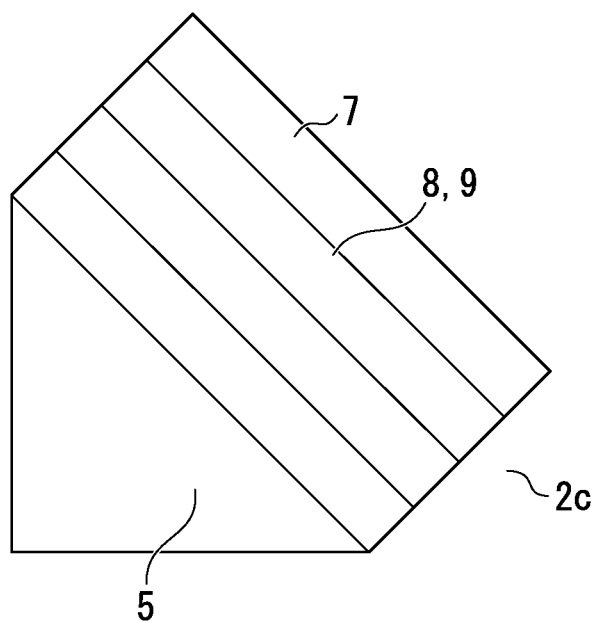
FIG. 6 is an enlarged perspective view of a dot-shaped light-emitting concave portion.

As shown in FIG. 6, a diffraction grating 8 is formed on the reflective surface 7. A diffraction grating is an optical element that diffracts light by a grid pattern to obtain spectra (interference fringes), and is a plane grating including grooves assembled in parallel at a constant pitch.

The diffraction grating 8 of the embodiment is formed by grooves 9 formed on the reflective surface 7 in parallel at a constant pitch. A direction of the grooves 9 is not particularly limited; however, they are preferably formed in the direction of a line in the reflective surface 7, in which the line is orthogonal to an intersection of a surface including the reflective surface 7 and the rear surface 2c.

For example, if the grooves 9 are formed in a direction which is not orthogonal to an intersection of the rear surface 2c and the reflective surface 7, but parallel to an intersection of the rear surface 2c and the reflective surface 7 (e.g., horizontal direction), it is not preferable for the following reasons.

Figure 7:
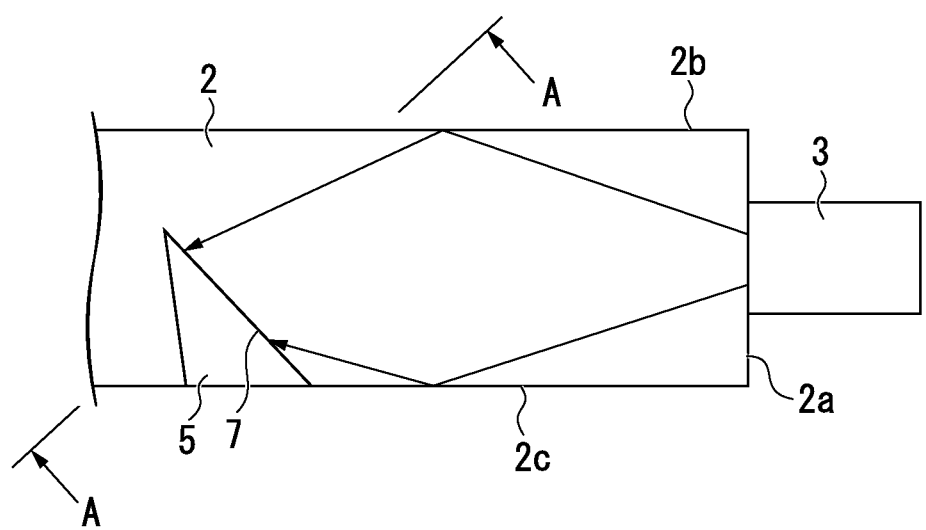
FIG. 7 is a cross-sectional view illustrating light entering onto a dot-shaped light-emitting concave portion.

As shown in FIG. 7, light output from the light source 3 spreads to some extent, and the spread light enters onto the reflective surface 7 while being reflected on the light-emitting surface 2b and the rear surface 2c of the light guide plate 2. The light which is output from the light source 3 followed by entering onto the reflective surface 7 enters not only directly from the horizontal direction, but also with various angles from upper and lower directions after being reflected repeatedly.

When the grooves 9 are formed in a direction which is parallel to a line where the rear surface 2c and the reflective surface 7 are intersected, light entered into the diffraction grating 8 is reflected and dispersed to a direction that is mostly vertical to the direction of the grooves. This means that light entered onto the reflective surface 7 is dispersed to upper and lower directions, and thus, when light enters onto the reflective surface 7 from upper and lower directions with various angles, the dispersed light is overlapped in upper and lower directions. As a result, an observer recognizes the light as a nearly white color due to overlapping of the dispersed light.

On the other hand, when the grooves 9 are formed in a direction which is orthogonal to a line where the rear surface 2c and the reflective surface 7 are intersected, a direction of the dispersed light is also mostly vertical to the direction of the grooves (i.e., horizontal direction), and thus, when light enters onto the reflective surface 7 from upper and lower directions with various angles, the dispersed light is not overlapped, and therefore, the resulting light is not close to a white color.

Figure 9:
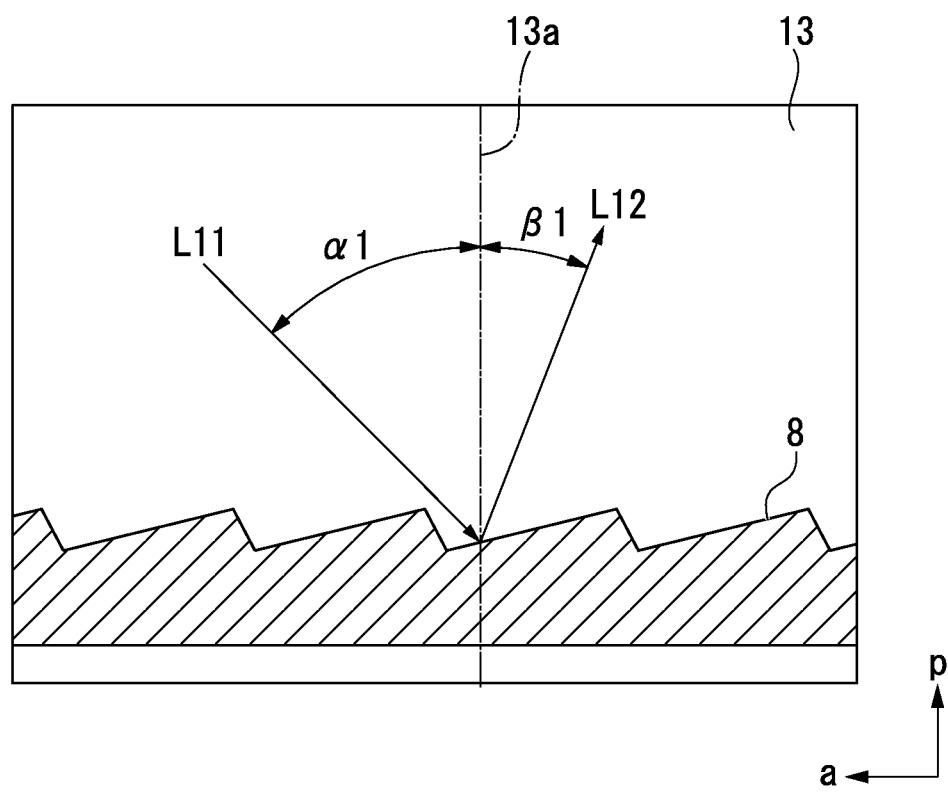
FIG. 9 is an enlarged cross-sectional view of grooves of a reflection-type diffraction grating.

As shown in FIG. 9, a shape of the groove 9 of the diffraction grating 8 is a so-called serrated shape (so-called blazed diffraction grating).

The number of grooves 9 per 1 mm in the diffraction grating 8 is equal to or more than 200 and equal to or less than 2000. That is, the distance between adjacent grooves 9 (a pitch of the groove 9) is equal to or more than 0.5 µm and equal to or less than 5 µm. When the pitch is too small or too large, a dispersion effect for visible light will not be sufficient.

A shape of the groove 9 is not limited to the serrated shape as long as the shape represents diffractive action. For example, a sine wave shape and rectangular shape can be used.

The operation of the light-emitting device 1 of the embodiment will be explained below.

As shown in FIG. 3, the incident light L1 enters from the end surface 2a, and propagates through the light guide plate 2. When some of the incident light L1 reflects on the reflective surface 7, it is dispersed on the diffraction grating 8, and is output from the light-emitting surface 2b as the output light L4.

In the light-emitting device 1, the light source 3 is not limited to be on the position facing the end surface 2a, and it can be on the side of the light-emitting surface 2b, or on the position where light can be entered from the side of the rear surface 2c onto the light guide plate 2.

As shown in FIG. 3, when the incident light L2 enters from the side of the light-emitting surface 2b, some of it reflects on the reflective surface 7, and is dispersed on the diffraction grating 8, and then output from the light-emitting surface 2b as the output light L4.

As will be described later, the diffraction grating 8 may be the transmission-type diffraction grating 8. In this case, when the incident light L3 enters from the side of the rear surface 2c, some of it transmits through the reflective surface 7, and is dispersed on the diffraction grating 8, and then output from the light-emitting surface 2b as the output light L4.

Hereinafter, diffraction of light on the diffraction grating 8 will be explained. Assume that light derived from the light source 3, which is in a certain range of wavelengths, enters into the reflection-type diffraction grating 8.

Figure 8:
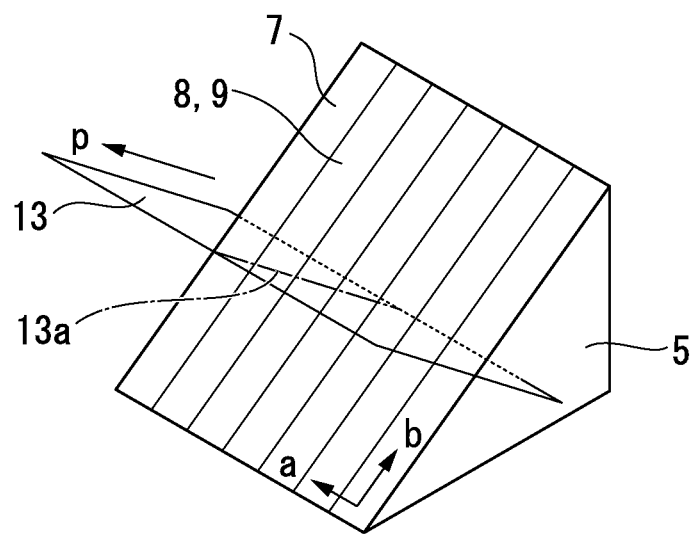
FIG. 8 is a schematic drawing representing a dot-shaped light-emitting concave portion.

As shown in FIG. 8, when defining that a direction vector of the groove 9 of the diffraction grating 8 is "b," a direction vector that is vertical to the groove 9 in the lattice plane (reflective surface 7) is "a," and a normal vector for a plane (lattice plane) that is defined by "a" and "b" is "p," a plane defined by "a" and "p" is defined as the main cross-section 13. The 13a is a line in the main cross-section 13, and is vertical to the lattice plane (normal line).

Firstly, diffraction occurring in the main cross-section 13 will be explained. As shown in FIG. 9, when the light having the wavelength λ (incident light L11) enters into the diffraction grating 8 with the incident angle α1, it is reflection-diffracted with the angle β1 to satisfy the following Equation (1) (output light L12).

Equation (1)

$$\sin \alpha 1 + \sin \beta 1 = Nm\lambda \ (m=0, \pm 1, \pm 2 \ldots) \quad (1)$$

Here, "m" is a diffraction order, and "N" is the number of the grooves 9 per 1 mm. α1 is an angle of the incident light L11 to the line 13a that is vertical to the lattice plane, and β1 is an angle of the output light L12 to the line 13a.

Equation (1) indicates that each light having the same incident angle α1, but having a different wavelength, is reflection-diffracted with a different angle.

According to this action, white light entered with the same angle is dispersed, and an observer can visually recognize different colors depending on angles of observation.

Figure 10:
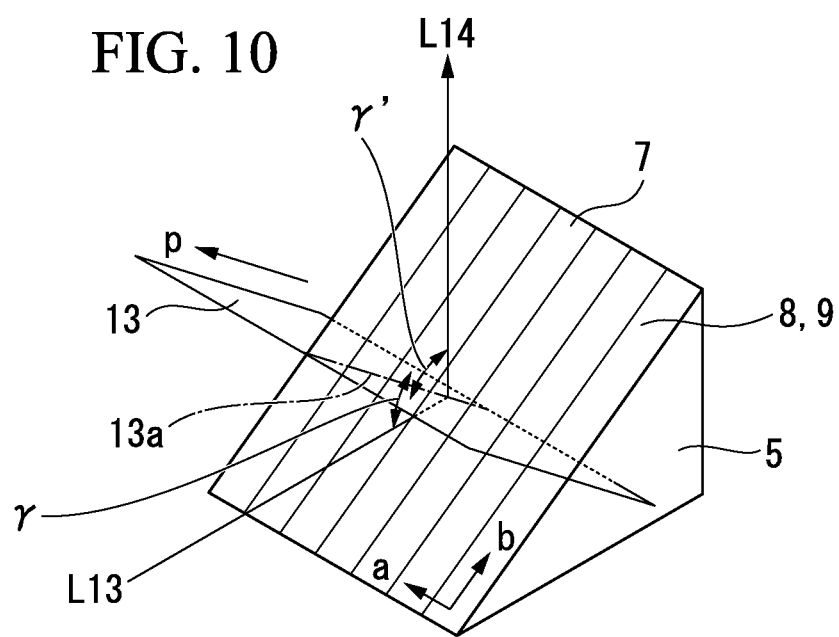
FIG. 10 is a schematic drawing representing a dot-shaped light-emitting concave portion.

FIG. 10 illustrates reflection of light on the lattice plane (reflective surface 7) when incident light does not exist in the main cross-section 13.

The incident light L13 that is sloped to the main cross-section 13 with the angle γ reflects on the lattice plane (reflective surface 7), and is then output as the output light L14. The relationship between the angle γ of the incident light L13 to the main cross-section 13 and the angle γ' of the output light L14 to the main cross-section 13 is represented by, for example, γ=γ'.

Figure 11:
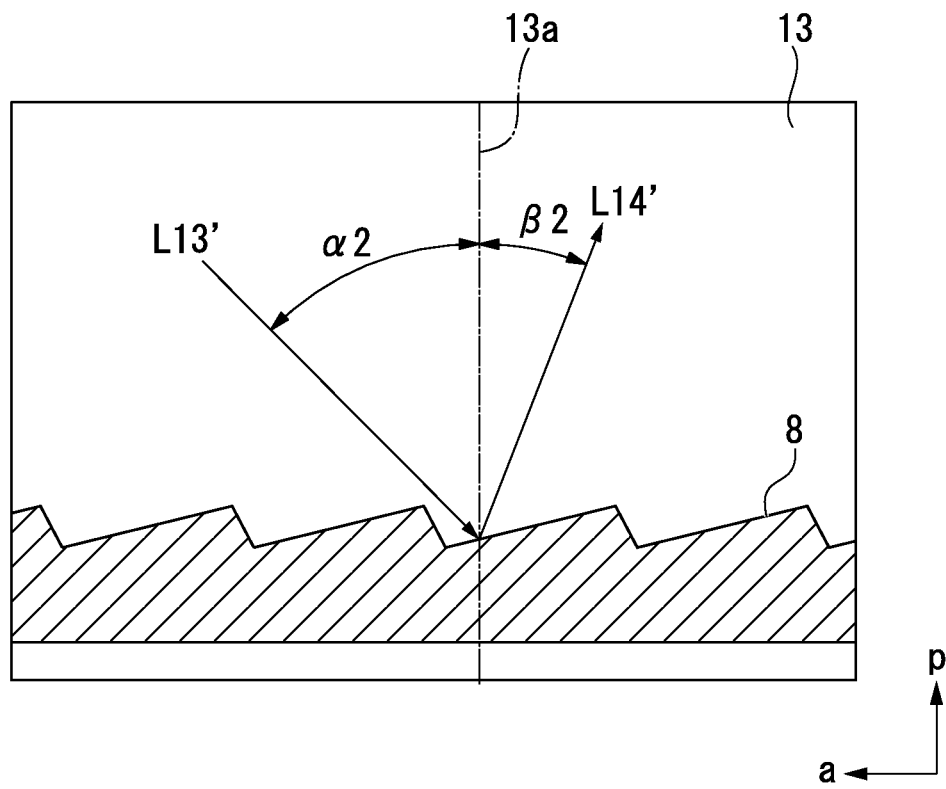
FIG. 11 is an enlarged cross-sectional view of grooves of a reflection-type diffraction grating.

FIG. 11 shows the line L13' that represents projection of the incident light L13 onto the main cross-section 13, and the line L14' that represents projection of the output light L14 onto the main cross-section 13. As shown in the figure, when the light having the wavelength λ (incident light L13') enters with the incident angle α2, it is reflection-diffracted with the angle β2 to satisfy the following Equation (2) (output light L14').

Equation (2)

$$\sin \alpha 2 + \sin \beta 2 = Nm\lambda/\cos \gamma \ (m=0, \pm 1, \pm 2 \ldots) \quad (2)$$

Here, "m" is a diffraction order, "N" is the number of the grooves 9 per 1 mm, α2 is an angle of the line L13', which represents projection of the incident light L13 onto the main cross-section 13, to the line 13a that is vertical to the lattice plane, β2 is an angle of the line L14', which represents projection of the output light L14 onto the main cross-section 13, to the line 13a, and γ is an angle of the incident light L13 to the main cross-section 13.

According to the present embodiment, light output from the light source 3 is spectrally reflected by the diffraction grating 8 formed on the reflective surface 7, and is reflected as light having a different wavelength, to a different direction. A relative positional relationship between the light source 3 and each of a plurality of the dot-shaped light-emitting concave portions 5 (angular relationship) is varied, and thus, even if each of the dot-shaped light-emitting concave portions 5 including a diffraction grating portion has a same shape and is arranged in a same direction, spatial distribution of an angle of each spectrally reflected light is different. Therefore, when the light-emitting device 1 is viewed at a particular point, each of the dots is viewed basically as a different color. In addition, when a view position is shifted, a color of each of the dots is also changed, and thereby a visual effect such that colors are changed can be added even if the light-emitting status of a light source 3 is constant.

On the contrary, even if a relative positional relationship between the light source 3 and each of a plurality of dot-shaped light-emitting concave portions 5 is varied, a setting in which a same color is spectrally reflected to a particular direction will be possible, for example, by adjusting a direction (angle) of the dot-shaped light-emitting concave portion 5.

Next, one example for manufacturing the light-emitting device 1 will be explained by reference to FIGS. 12-14.

Figure 12:
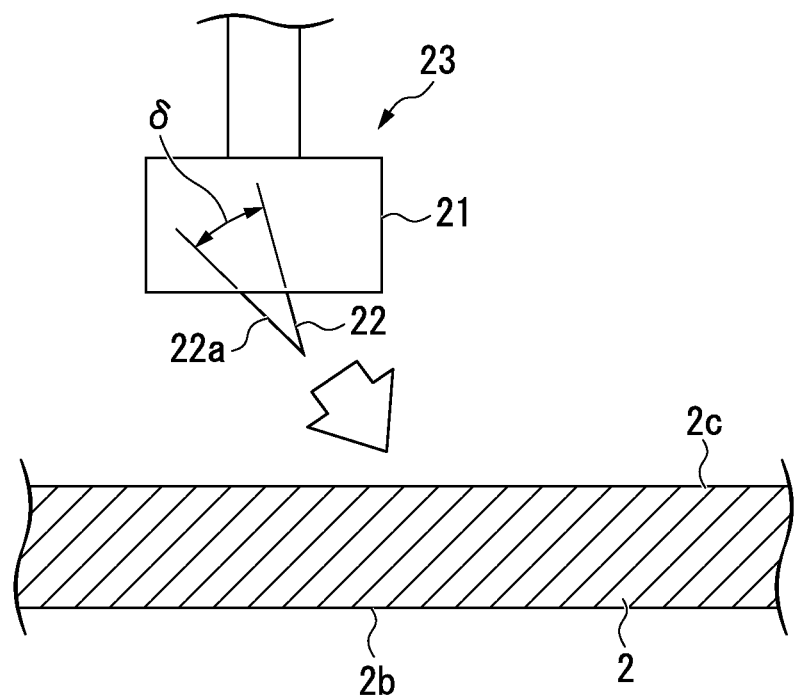
FIG. 12 is a process drawing representing a manufacturing method of the light-emitting device shown in FIG. 1.

As shown in FIG. 12, a processing tool 23 in which a cutting portion 22 protrudes from an undersurface of a basal portion 21 is used. A shape of the cutting portion 22 depends on the dot-shaped light-emitting concave portion 5, and a diffraction grating is formed on a portion 22a corresponding to the reflective surface 7. δ is an apex angle of the cutting portion 22.

Figure 13:
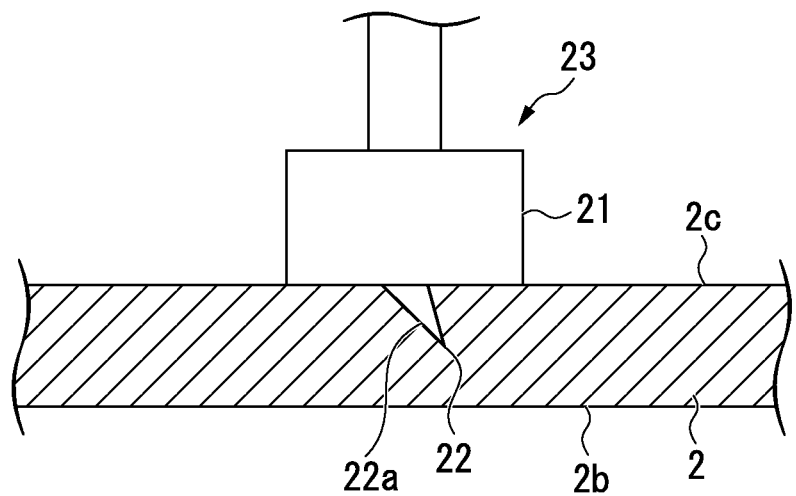
FIG. 13 is a process drawing representing a manufacturing method of the light-emitting device shown in FIG. 1.
Figure 14:
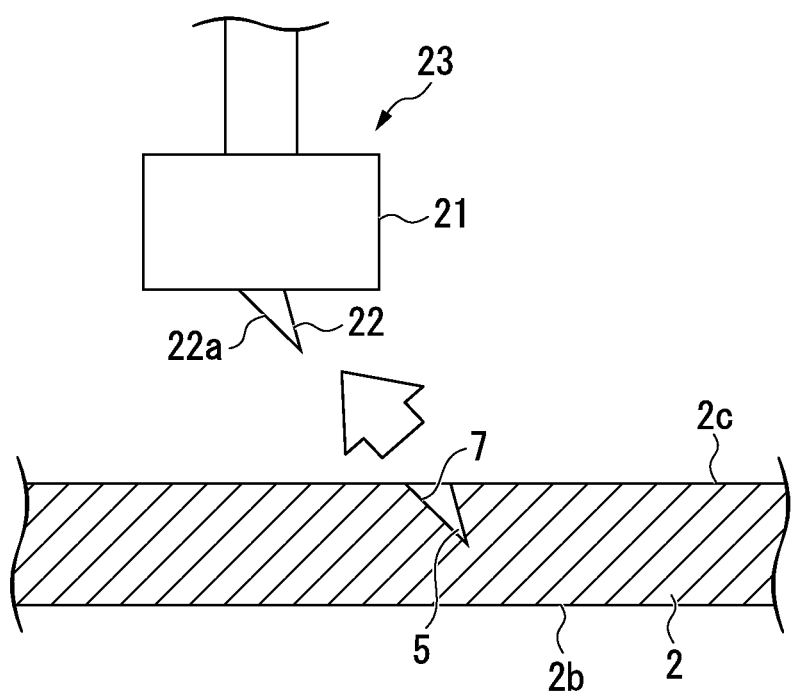
FIG. 14 is a process drawing representing a manufacturing method of the light-emitting device shown in FIG. 1.

As shown in FIG. 13, the cutting portion 22 is pushed into the rear surface 2c of the light guide plate 2 by lowering the processing tool 23 along with the direction where the cutting portion 22 is formed. At that time, both of, or one of the cutting portion 22 and the light guide plate 2 can be heated to a temperature that is equal to or higher than a softening point of a material of the light guide plate 2. After pushing in, a material of the light guide plate is cooled to a temperature that is equal to or lower than the softening point, and then the cutting portion 22 is pulled out by raising the processing tool 23 as shown in FIG. 14. A variety of heating methods such as a heater, ultrasound, high frequency wave, infrared ray, laser and the like can be used.

Also, by adjusting an angle of the portion 22a that is a portion of the cutting portion 22 (an angle to the rear surface 2c), an angle of the reflective surface 7 of the formed dot-shaped light-emitting concave portion 5 to the rear surface 2c (the angle α in FIG. 3) can be adjusted.

According to the above, the dot-shaped light-emitting concave portion 5 whose shape is along with the cutting portion 22 is formed on the rear surface 2c of the light guide plate 2.

Then, by repeating a similar manipulation by horizontally moving the processing tool 23, the display portion 6 including a plurality of the dot-shaped light-emitting concave portions 5 is formed to obtain the light-emitting device 1.

According to the manufacturing method using the processing tool 23, the dot-shaped light-emitting concave portion 5 having a correct shape can be formed on any positions, and thereby a light guide plate with a flexible design can be manufactured.

In addition, light guide plates with a variety of designs can be manufactured basically if only one processing tool 23 having a small blade on which a diffraction grating surface is formed is prepared, expensive diffraction gratings are not needed even if a design is changed, and thus, the costs can be greatly reduced.

This manufacturing method is used to form the dot-shaped light-emitting concave portion one by one, and therefore, it does not seem to be suitable for large-scale production; however, when producing same products on a large-scale, a light guide plate made by such a method can be utilized as a master to make a template by electroforming and the like, and then injection molding, press molding and the like can be performed by using the template.

Figure 15:
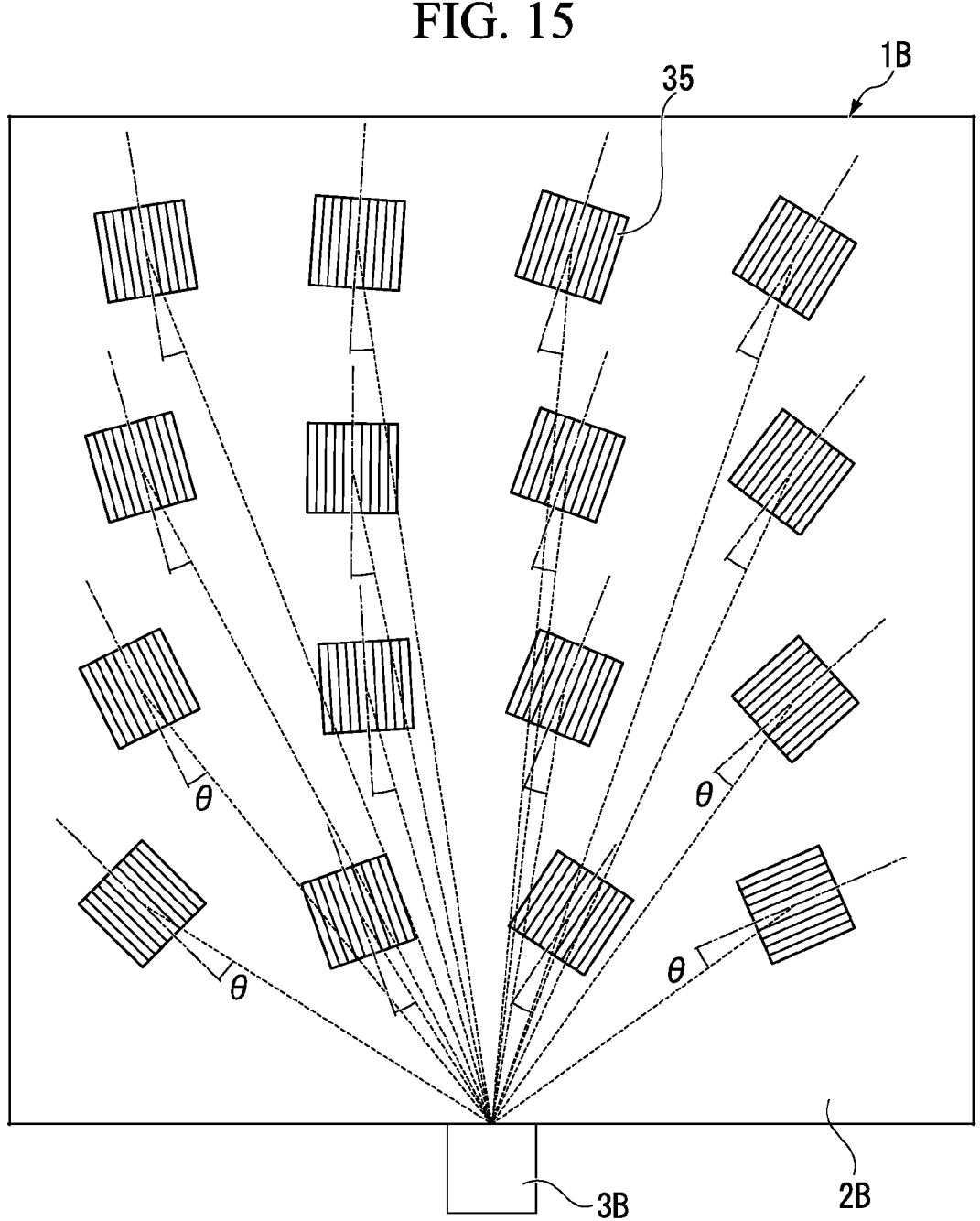
FIG. 15 is a plan view of a light-emitting device according to another embodiment of the present invention.

Next, the light-emitting device 1B of another embodiment will be explained. As shown in FIG. 15, in the light-emitting device 1B, the position and direction of a dot-shaped light-emitting concave portion 35 is different from those of the dot-shaped light-emitting concave portion 5 of the light-emitting device 1 (FIG. 1 and the like).

In the light-emitting device 1B, a white light point source is used as the light source 3B, and it is located on the center of the bottom of the rectangular light guide plate 2B in the planar view.

An example of the dot-shaped light-emitting concave portions 35 that are positioned with the 4×4 matrix state is shown. The shape and pitch of the diffraction grating in each of the dot-shaped light-emitting concave portions 35 are the same. In this example, a slope angle of the light output surface 7 to the rear surface 2c is identical to each other in all of the dot-shaped light-emitting concave portions 35.

Grooves in each of the dot-shaped light-emitting concave portions 35 are located in a direction where the grooves are sloped with a certain angle θ to a straight line that connects the center of the dot-shaped light-emitting concave portion 35 and the center of the light source 3B. The angle θ is set as an angle with which light having an identical wavelength is reflection-diffracted from a reflective surface of the dot-shaped light-emitting concave portion 35 to a direction vertical to a plane of the light guide plate. In such a position, light having a certain identical wavelength is reflected from all of the dot-shaped light-emitting concave portions to a direction vertical to a plane of the light guide plate, and therefore, when the view position is at infinity, all of the dot-shaped light-emitting concave portions are viewed as a same color.

In the embodiment of above, although the dot-shaped light-emitting concave portions 35 are positioned with the 4×4 matrix state, the number and positioning of the dot-shaped light-emitting concave portion 35 are not limited to these. In addition, the setting can be made not only in the case that whole of the light guide plate can be viewed as a same color, but also in the case that that the dot-shaped light-emitting concave portion 35 can be viewed as a same color in each of the regions set on the light guide plate.

Furthermore, by adjusting each of the angles θ respectively, a particular color can be visually recognized respectively even if a view position is set on a limited position.

As stated above, each of the dot-shaped light-emitting concave portions 35 can be made to be seen as any colors from a set view position respectively, and thus, for example, the dot-shaped light-emitting concave portions 35 can be positioned on a whole surface of a light guide plate so that the whole surface can be seen as a same color, or a particular region can be seen as a particular color.

Also, a representation is possible in which each of the dot-shaped light-emitting concave portions shows random (irregular) colors on at least a part of regions, that is, colors can be made to distribute randomly. When each of the dot-shaped light-emitting concave portions is made to be random colors, the angles θ of the dot-shaped light-emitting concave portions positioned on the whole of the light guide plate 2 are preferably defined in a given angle range by using random numbers.

Figure 16:
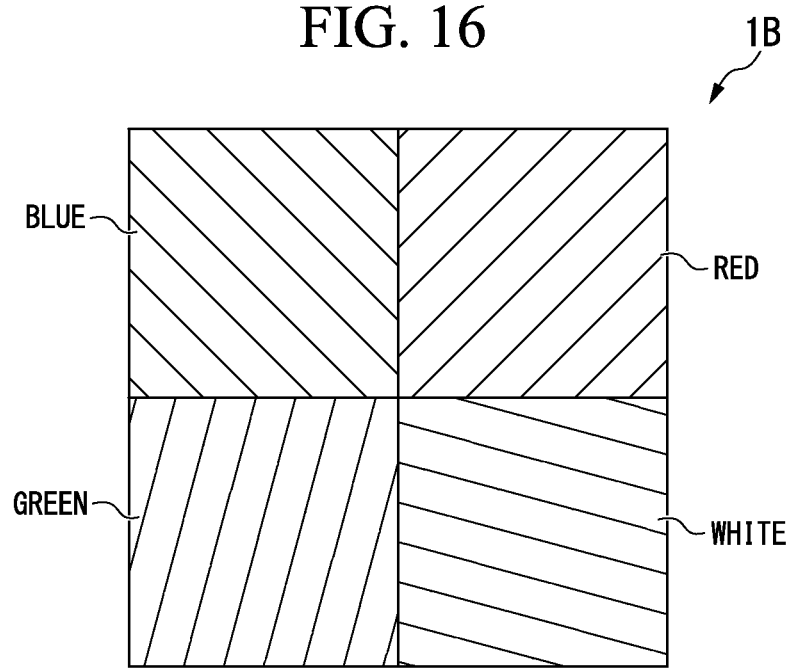
FIG. 16 is a plan view of a light-emitting device according to still another embodiment of the present invention.

Also, as shown in FIG. 16, each of the regions can be visually recognized such that one region is as red, one region is as blue, one region is as green, and one region is as white.

Adjustment of a color of the dot-shaped light-emitting concave portion 5 which is visually recognized will be possible not only by adjusting the angle θ of the groove (see FIG. 15), but also by adjusting the slope angle of the reflective surface 7 (the angle α shown in FIG. 3). Accordingly, a color of the dot-shaped light-emitting concave portion 5 can be set by adjusting both of, or one of, the slope angle α of the reflective surface 7 and the angle θ of the groove. The slope angle of the reflective surface 7 also affects the reflection efficiency of light, and thus, when adjusting a color with the slope angle α of the reflective surface 7 and the angle θ of the groove, reflection efficiency must also be considered.

A color of the dot-shaped light-emitting concave portion 5 is changed depending on a position of an observer. In normal use of the light-emitting device 1, in most cases, a position of an observer changes. Therefore, although designing is difficult in order to visually recognize one particular color that is preliminarily set, designing is possible in order to visually recognize any colors that belong to a certain range of hue.

For example, a design in which any colors in a range including yellow to red of a hue circle is visually recognized on one dot-shaped light-emitting concave portion 5, and any colors in a range including green to blue is visually recognized on another dot-shaped light-emitting concave portion 5 is possible. In this case, although a color of the dot-shaped light-emitting concave portion 5 is changed depending on a position of an observer, the change is limited within the range described above.

Also, a design in which some dot-shaped light-emitting concave portions 5 represent colors in a certain range, and some other dot-shaped light-emitting concave portions 5 represent random colors described above is also possible.

Figure 18A:
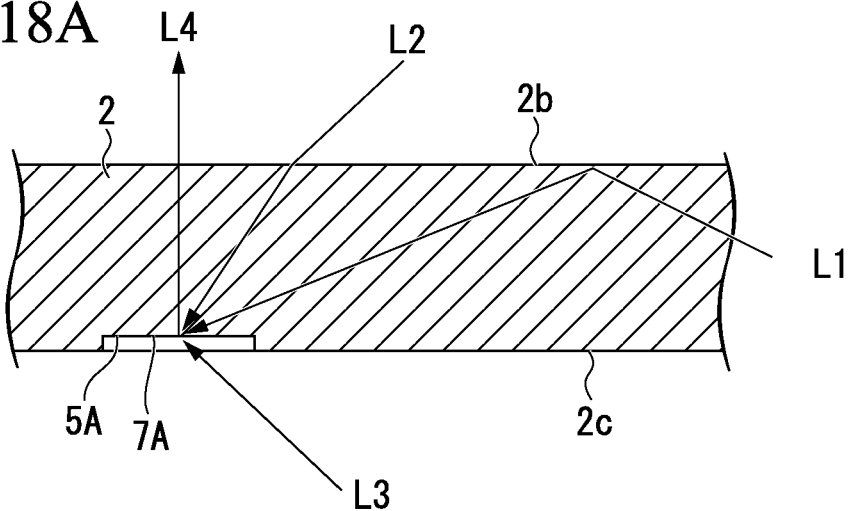
FIG. 18A shows an enlarged cross-sectional view of another example of the dot-shaped light-emitting concave portion.
Figure 18B:
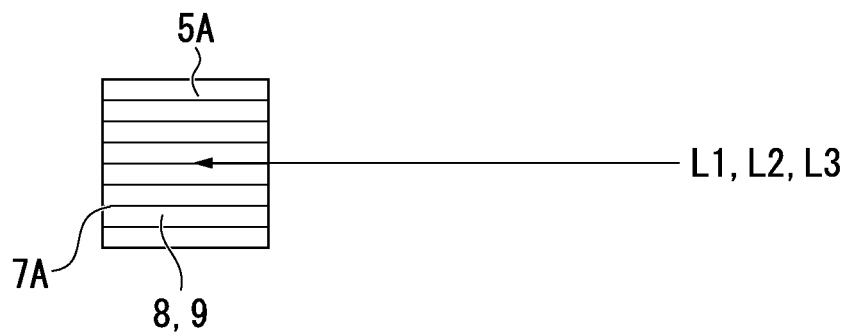
FIG. 18B shows a plan view of another example of the dot-shaped light-emitting concave portion.
Figure 19:
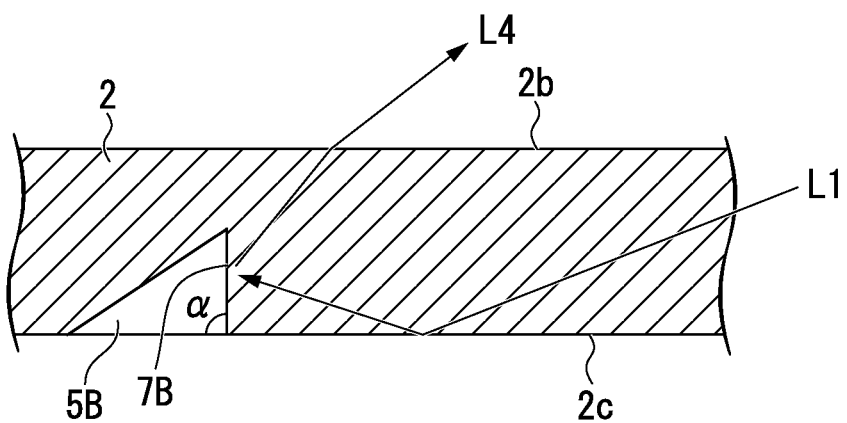
FIG. 19 is an enlarged cross-sectional view of another example of the dot-shaped light-emitting concave portion.

FIGS. 18A, 18B, and 19 show one example of the dot-shaped light-emitting concave portion 5, in which a slope angle of the light output surface 7 (reflective surface or transmission surface) to the rear surface 2c is different from that shown in FIG. 3.

FIGS. 18A and 18B show the dot-shaped light-emitting concave portion 5A as one example of the dot-shaped light-emitting concave portion 5. FIG. 18A is a cross-sectional view and FIG. 18B is a plan view. As shown in FIG. 18A, the dot-shaped light-emitting concave portion 5A is a concave portion whose depth from the rear surface 2c is constant.

The light output surface 7 (7A) is an upper surface of the dot-shaped light-emitting concave portion 5A, and its slope angle (to the rear surface 2c) is 0°. As shown in FIG. 18B, a shape in a planar view of the dot-shaped light-emitting concave portion 5A can be a substantial rectangle.

The incident light L1 enters from the end surface 2a, and propagates through the light guide plate 2. When some of the incident light L1 reflects on the light output surface 7A (reflective surface), it is dispersed on the diffraction grating 8, and is output from the light-emitting surface 2b as the output light L4.

When some of the incident light L2 from the side of the light-emitting surface 2b reflects on the light output surface 7A (reflective surface), it is dispersed on the diffraction grating 8, and then output from the light-emitting surface 2b as the output light L4.

When some of the incident light L3 from the side of the rear surface 2c transmits through the light output surface 7A (transmission surface), it is dispersed on the diffraction grating 8, and then output from the light-emitting surface 2b as the output light L4.

FIG. 19 is a cross-sectional view of the dot-shaped light-emitting concave portion 5B in which the slope angle α of the light output surface 7 (reflective surface) to the rear surface 2c is 90°.

When the incident light L1, which propagates through the light guide plate 2, reflects on the light output surface 7 (7B)

(reflective surface), it is dispersed on the diffraction grating 8, and is output from the light-emitting surface 2b as the output light L4.

Figure 20:
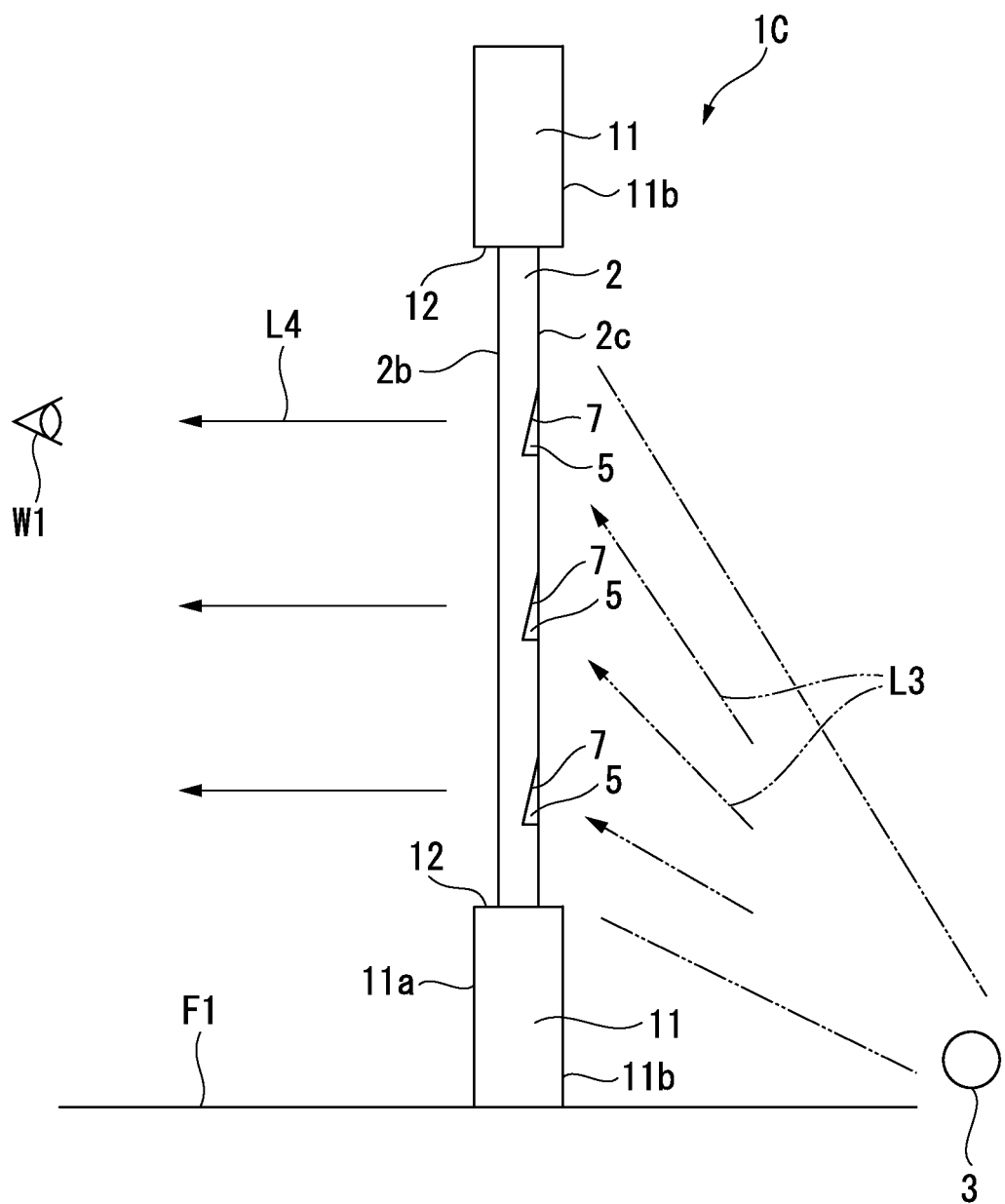
FIG. 20 is a configuration representing a light-emitting device according to another embodiment of the present invention.

FIG. 20 shows another embodiment of the light-emitting device of the present invention, and in the light-emitting device 1C shown in the figure, the light guide plate 2 is fitted into the opening 12 formed on the wall portion 11.

The light guide plate 2 is provided such that the light-emitting surface 2b faces a front surface 11a of the wall portion 11. The light guide plate 2 can be vertical to the floor surface F1.

The light source 3 is provided on the side of the back surface 11b of the wall portion 11, and the position is away from a back surface 11b. The light source 3 is preferably provided on the position where the observer W1 who is at the side of the front surface 11a cannot see it due to interruption by the wall portion 11. The light source 3 can be provided on the position whose height is close to the floor surface F1. The observer W1 can visually recognize a background (the side of the rear surface 2c) through the light guide plate 2.

When the light L3, which is output from the light source 3, and then enters onto the light guide plate 2 from the side of the rear surface 2c, transmits through the light output surface 7 (transmission surface), it is dispersed on the diffraction grating 8, and then output from the side of the light-emitting surface 2b as the output light L4 (see FIG. 3).

Note that a lens can be placed between the light source 3 and the light guide plate 2 so that light from the light source 3 is paralleled by the lens and then enters onto the light guide plate 2.

Hereinafter, diffraction of light on the transmission-type diffraction grating 8 will be explained. Identical reference signs will be given to the structures that are previously described to explain diffraction of light on the reflection-type diffraction grating 8, and re-explanation of them will be omitted.

Figure 21:
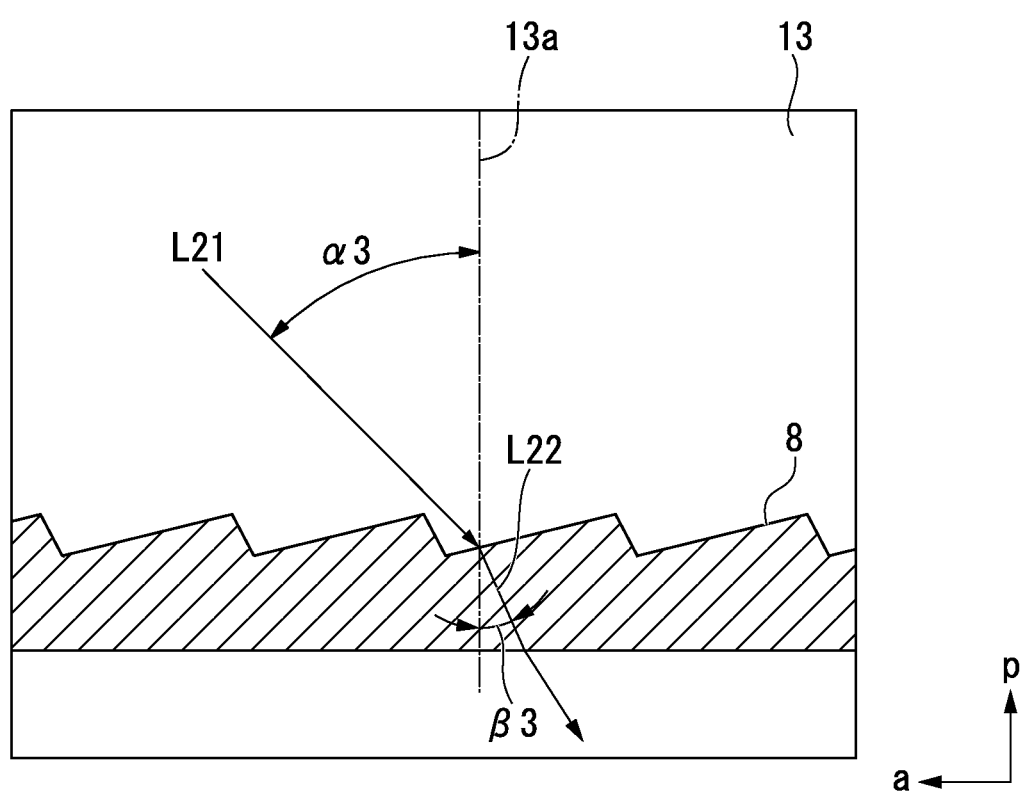
FIG. 21 is an enlarged cross-sectional view of grooves of a transmission-type diffraction grating.

Firstly, diffraction in the main cross-section 13 (see FIG. 8) will be explained. As shown in FIG. 21, when the light having the wavelength λ (incident light L21) enters into the diffraction grating 8 with the incident angle α3, it is transmission-diffracted with the angle β3 to satisfy the following Equation (3) (transmitted light L22).

Equation (3)

$$\sin \alpha 3 + \sin \beta 3 = Nm\lambda \ (m=0, \pm 1, \pm 2 \ldots) \quad (3)$$

In which "m" is a diffraction order, and "N" is the number of the grooves 9 per 1 mm. α3 is an angle of the incident light L21 to the line 13a that is vertical to the lattice plane, and β3 is an angle of the transmitted light L22 to the line 13a.

Equation (3) indicates that each light having the same incident angle α3, but having a different wavelength, is transmission-diffracted with a different angle.

According to this action, white light entering with the same angle is dispersed, and an observer can visually recognize different colors depending on angles of observation.

Figure 22:
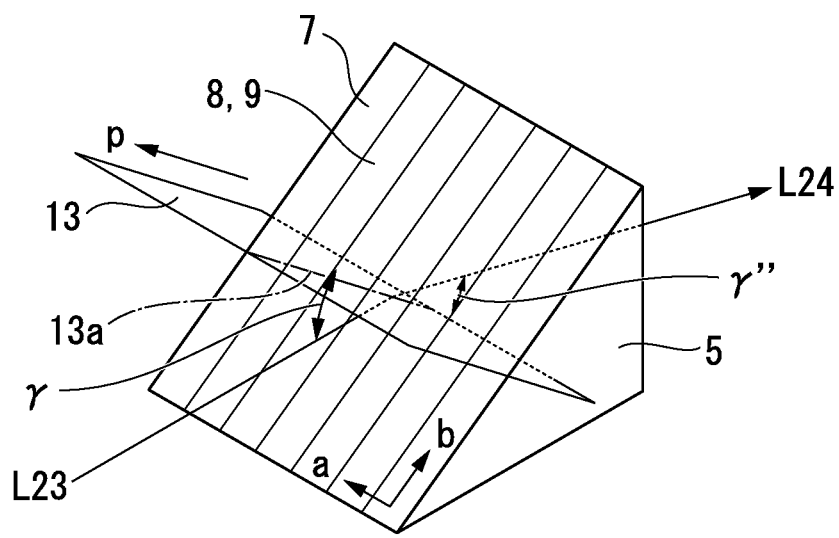
FIG. 22 is a schematic drawing representing a dot-shaped light-emitting concave portion.

FIG. 22 illustrates transmission of light through the lattice plane (transmission surface 7) when incident light does not exist in the main cross-section 13.

The incident light L23 that is sloped to the main cross-section 13 with the angle γ transmits through the lattice plane (transmission surface 7), and becomes the transmitted light L24. The angle γ" is the angle of the transmitted light L24 to the main cross-section 13.

Figure 23:
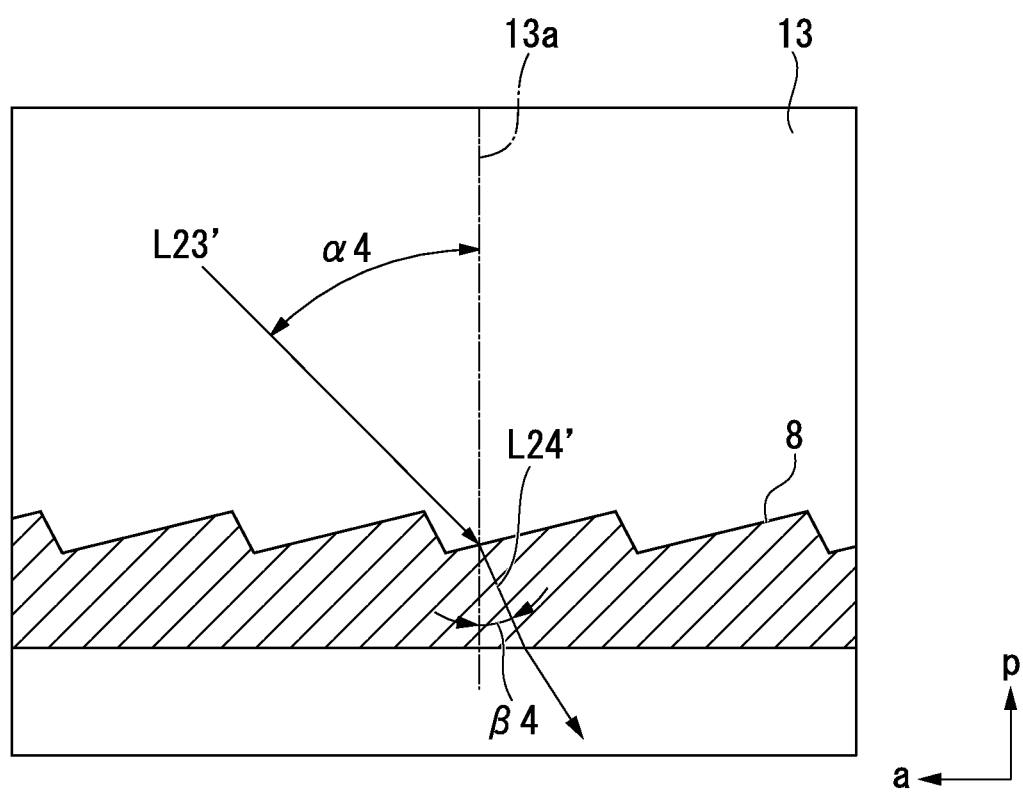
FIG. 23 is an enlarged cross-sectional view of grooves of a transmission-type diffraction grating.

FIG. 23 shows the line L23' that represents projection of the incident light L23 onto the main cross-section 13, and the line L24' that represents projection of the output light L24 onto the main cross-section 13. As shown in the figure, when the light having the wavelength λ (incident light L23') enters with the incident angle α4, it is transmission-diffracted with the angle β4 to satisfy the following Equation (4) (transmitted light L24').

Equation (4)

$$\sin \alpha 4 + \sin \beta 4 = Nm\lambda/\cos \gamma \ (m=0, \pm 1, \pm 2 \ldots) \quad (4)$$

In which "m" is a diffraction order, "N" is the number of the grooves 9 per 1 mm, α4 is an angle of the line L23', which represents projection of the incident light L23 onto the main cross-section 13, to the line 13a that is vertical to the lattice plane, β4 is an angle of the line L24', which represents projection of the output light L24 onto the main cross-section 23, to the line 13a, and γ is an angle of the incident light L13 to the main cross-section 13. Note that "+" in the left-hand sides of Equations (1)-(4) can also be "±".

In this embodiment (light-emitting device 1C), also light output from the light source 3 is dispersed by the diffraction grating 8 of the light output surface 7 (transmission surface), and is output as light having a different wavelength, to a different direction. Accordingly, each of the dot-shaped light-emitting concave portions 5 is viewed basically as a different color.

Figure 24:
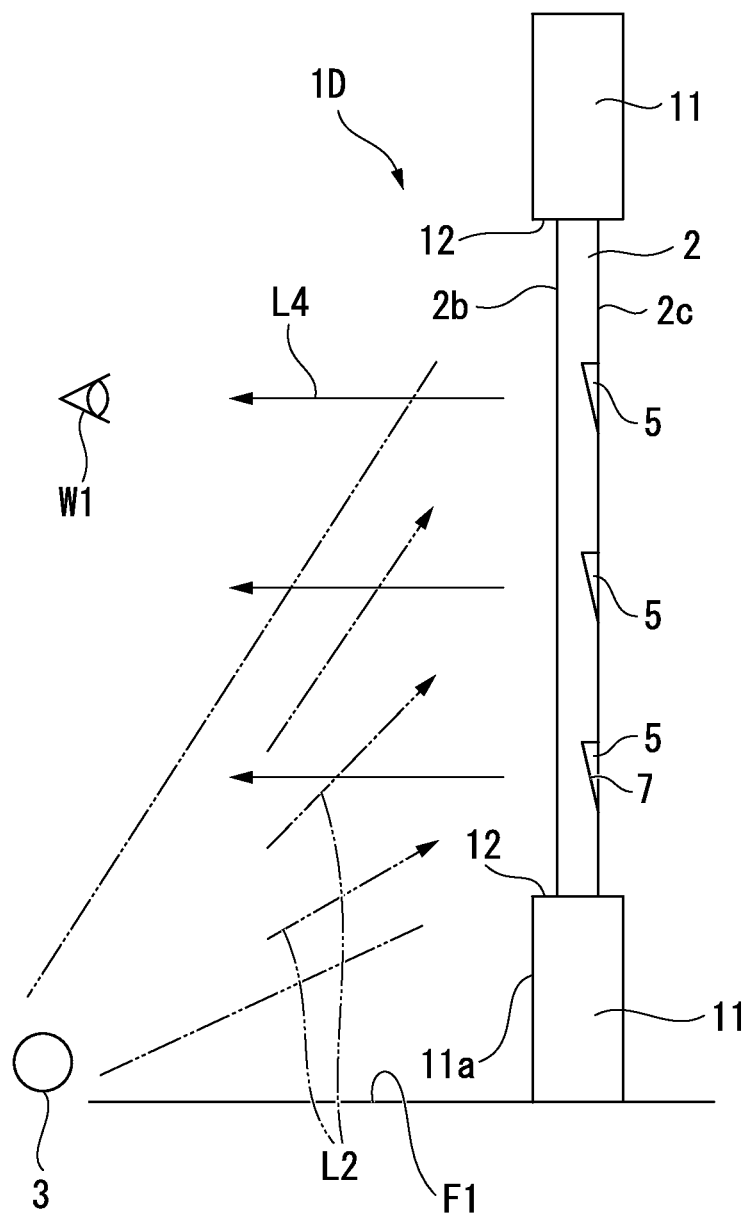
FIG. 24 is a configuration representing a light-emitting device according to another embodiment of the present invention.

FIG. 24 shows another embodiment of the light-emitting device of the present invention, and the light-emitting device 1D shown in the figure is provided with the light source 3 on the side of the front surface 11a of the wall portion 11, and thus, the light-emitting device 1D is different from the light-emitting device 1C shown in FIG. 20. The light source 3 is provided on the position forward from the front surface 11a.

When the incident light L2 that is output from the light source 3 reflects on the light output surface 7 (reflective surface), it is dispersed by the diffraction grating 8, and then output from the side of the light-emitting surface 2b as the output light L4.

Figure 25:
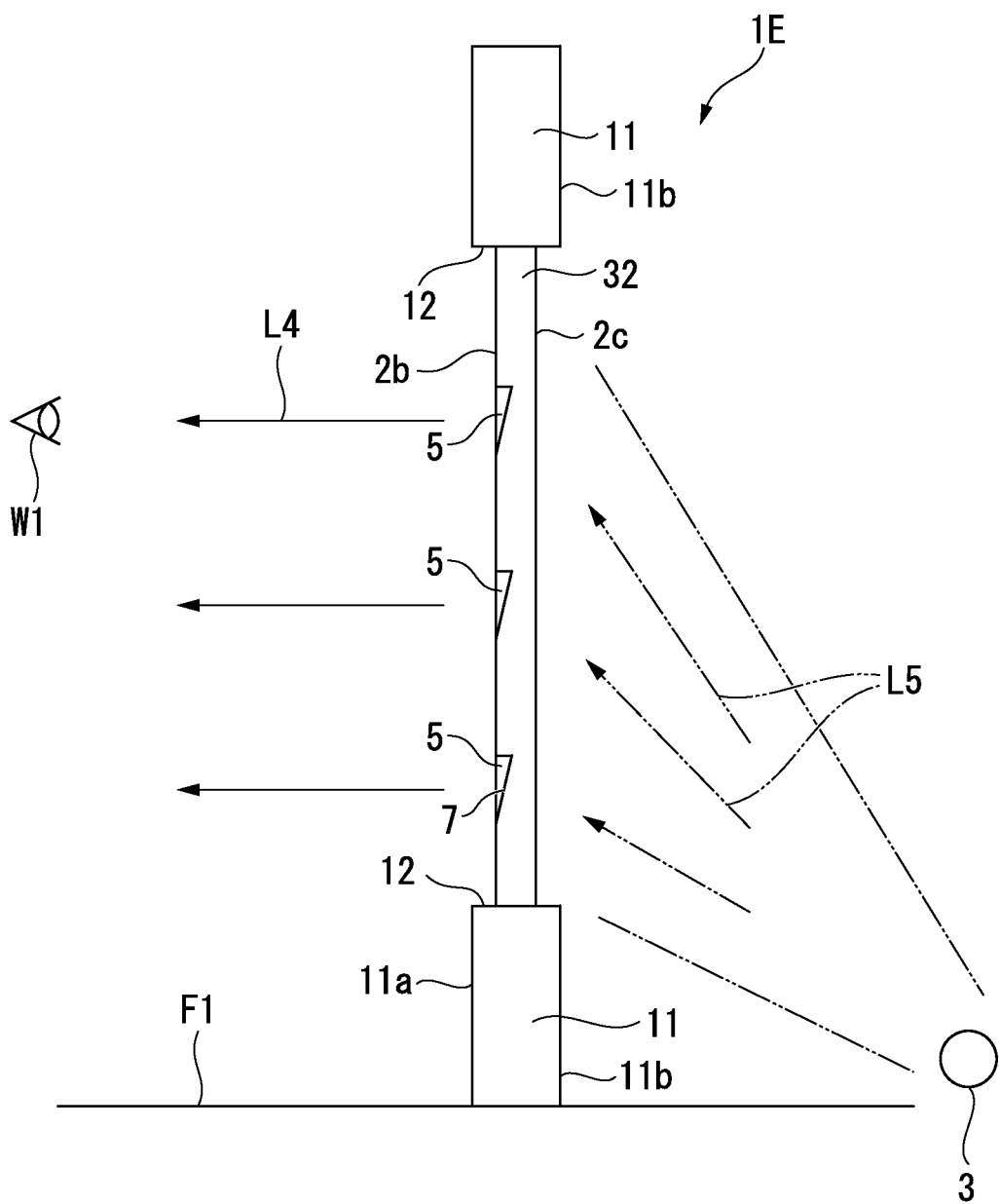
FIG. 25 is a perspective view representing a light-emitting device according to another embodiment of the present invention.

FIG. 25 shows still another embodiment of the light-emitting device of the present invention, and the light-emitting device 1E shown in the figure has the same structure as that of the light-emitting device 1C shown in FIG. 20 except that the light guide plate 32 is used instead of the light guide plate 2.

In the light guide plate 32, the dot-shaped light-emitting concave portions 5 are formed not on the rear surface 2c, but on the light-emitting surface 2b.

The light guide plate 32 is provided such that the light-emitting surface 2b faces the front surface 11a of the wall portion 11.

When the light L5, which is output from the light source 3, and then enters onto the light guide plate 32 from the side of the rear surface 2c, transmits through the light output surface 7, it is dispersed on the diffraction grating 8, and then output from the side of the light-emitting surface 2b as the output light L4.

Figure 26:
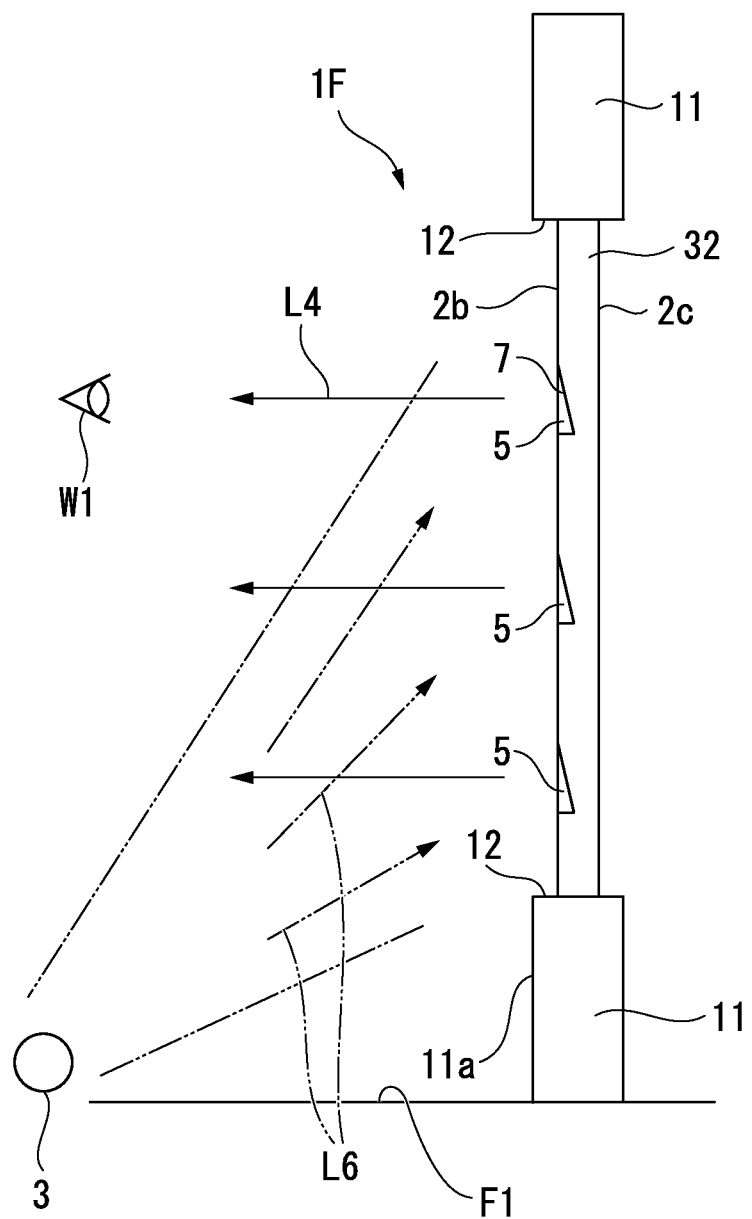
FIG. 26 is a configuration representing a light-emitting device according to another embodiment of the present invention.

FIG. 26 shows still another embodiment of the light-emitting device of the present invention, and the light-emitting device 1F shown in the figure is provided with the light source 3 on the side of the front surface 11a of the wall portion 11, and thus, the light-emitting device 1F is different from the light-emitting device 1E shown in FIG. 25.

A structure of the light-emitting device 1F can be the same as that of the light-emitting device 1E shown in FIG. 25, except for the light source 3 and the light guide plate 32.

When the light L6 that is output from the light source 3 reflects on the light output surface 7 (reflective surface), it is dispersed by the diffraction grating 8, and then output from the side of the light-emitting surface 2b as the output light L4.

Figure 27:
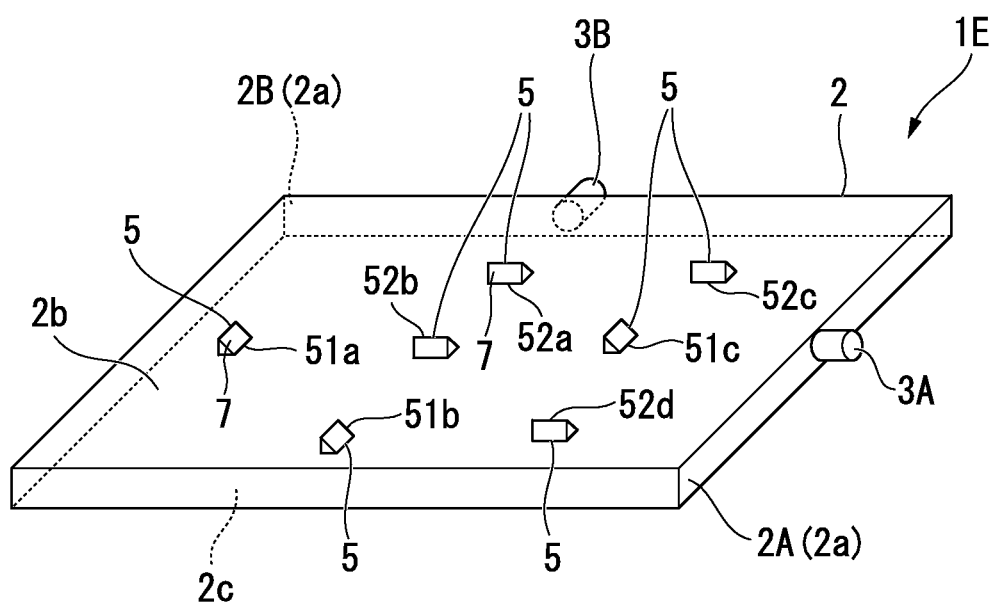
FIG. 27 is a perspective view representing a light-emitting device according to another embodiment of the present invention.

FIG. 27 shows still another embodiment of the light-emitting device of the present invention, and the light-emitting device 1G shown in the figure has the light guide plate 2 and the two light sources 3A and 3B.

The light source 3A is formed on the end surface 2a of the side 2A of the substantial rectangular light guide plate 2, and the light source 3B is formed on the end surface 2a of the side 2B that is adjacent to the side 2A of the light guide plate 2.

The dot-shaped light-emitting concave portions 5 are formed on a position and in a direction which correspond to the position of the light sources 3A and 3B, and thereby the dot-shaped light-emitting concave portions 5 can reflect light derived from the light sources 3A and 3B to the side of the light-emitting surface 2b.

Particularly, the dot-shaped light-emitting concave portions 5 have the dot-shaped light-emitting concave portions 51a, 51b, and 51c having the reflective surfaces 7 that reflect light derived from the light source 3A; and the dot-shaped light-emitting concave portions 52a, 52b, 52c, and 52d having the reflective surfaces 7 that reflect light derived from the light source 3B.

The dot-shaped light-emitting concave portions 5 can be placed so that each of the dot-shaped light-emitting concave portions 5 which reflect light derived from the light sources 3A or 3B represents a pattern different to each other.

By turning on only one of the light sources 3A and 3B, different patterns can be represented depending on the light sources 3A or 3B.

The number of light sources is not limited to 2, and any numbers of 3 or greater can be used.

Figure 17:
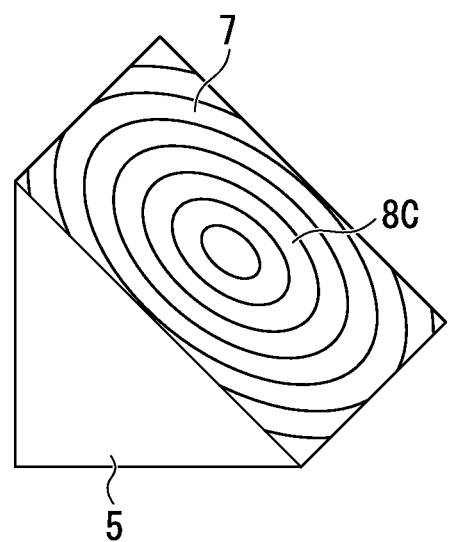
FIG. 17 is an enlarged perspective view of a dot-shaped light-emitting concave portion according to another embodiment of the present invention.

Note that the scope of the art of the present invention is not limited to the above embodiments, and a variety of changes can be made without departing from purposes of the present invention. For example, although the diffraction grating in the embodiments explained above is a linear groove, it is not limited to that, and can be structured with a plurality of concentric grooves as shown in FIG. 17. In addition, it can be a so-called hologram pattern.

A reflective surface of the dot-shaped light-emitting concave portion can be coated with Ag, Al, a multilayer film and the like. By such a reflection coating, spectral reflection of light becomes stable even if the light enters onto a reflective surface with an angle that is over a total reflection critical angle.

In addition, although a white light point source is used as the light source, it does not need to be totally white light, and for example, it can be yellow light in which red and green light are mixed, or light of some color in which red, blue, and green light are mixed. An effect of the present invention is the same if dispersed light is visually recognized as a color different from a color of original light.

Particularly in LEDs, even a monochromatic light has a broader wavelength range, and a monochromatic light of a pure color can be visually recognized by dispersing the light, and thus, such monochromatic light can also be used.

Although only one light source is used in the above embodiments, two or more light sources can also be used. That is, a plurality of light-emitting diodes or laser diodes can be aligned as light sources in a direction to where a light guide plate extends. However, if too many light sources are placed so they are close to each other, a plurality of horizontal angles of light that enters onto a dot-shaped light-emitting concave portion exists, and therefore, an effect of dispersion will be decreased such that dispersed light becomes close to white light. By placing a plurality of light sources, and turning them on sequentially or randomly one by one, colors of dots can be changed without overlapping of light.

What is claimed is:

1. A light-emitting device comprising a transparent light guide plate and a light source that irradiates light onto the light guide plate, wherein:
   a plurality of dot-shaped light-emitting concave portions comprising light output surfaces that output incident light derived from the light source from light-emitting surfaces are formed on the light guide plate; and
   a diffraction grating, which is an assembly of grooves paralleled at a constant pitch, is formed on each of the light output surfaces of the dot-shaped light-emitting concave portions.

2. The light-emitting device according to claim 1, wherein the light output surface is a reflective surface that reflects light derived from the light source, and outputs the light from the light-emitting surface.

3. The light-emitting device according to claim 1, wherein the light output surface is a transmission surface that transmits light derived from the light source, and outputs the light from the light-emitting surface.

4. The light-emitting device according to claim 1, wherein the dot-shaped light-emitting concave portions are formed on a rear surface that is opposite the light-emitting surface of the light guide plate.

5. The light-emitting device according to claim 1, wherein the light source is provided on an end surface of the light guide plate, and irradiates light from the end surface.

6. The light-emitting device according to claim 2, wherein the light source is provided on an end surface of the light guide plate, and irradiates light from the end surface.

7. The light-emitting device according to claim 4, wherein the grooves of the diffraction grating are formed in the direction of a line on the light output surface, wherein the line is orthogonal to an intersection of a surface including the light output surface and the rear surface.

8. The light-emitting device according to claim 1, wherein the number of grooves in the diffraction grating is equal to or more than 200 and equal to or less than 2000 per 1 mm.

9. The light-emitting device according to claim 1, wherein the plurality of dot-shaped light-emitting concave portions are arranged to form a particular design as a whole.

10. The light-emitting device according to claim 1, wherein an angle of the light output surface to a rear surface that is opposite the light-emitting surface of the light guide plate is equal to or more than 0° and equal to or less than 90°.

11. The light-emitting device according to claim 1, wherein an angle θ of the dot-shaped light-emitting concave portions to the light source is adjusted so that a same color is observed within at least a partial area in the light guide plate when viewed from a certain point.

12. The light-emitting device according to claim 1, wherein an angle θ of the dot-shaped light-emitting concave portions to the light source is adjusted so that a color is randomly distributed within at least a partial area in the light guide plate when viewed from a certain point.

13. The light-emitting device according to claim 1, wherein the light source is a plurality of the light-emitting diodes or laser diodes that are aligned in a direction to which the light guide plate extends.

14. The light-emitting device according to claim 1, wherein all of the light source is a white light source.

* * * * *